US011472664B2

(12) United States Patent
Nanda et al.

(10) Patent No.: US 11,472,664 B2
(45) Date of Patent: Oct. 18, 2022

(54) ELEVATOR SYSTEM TO DIRECT PASSENGER TO TENANT IN BUILDING WHETHER PASSENGER IS INSIDE OR OUTSIDE BUILDING

(71) Applicant: Otis Elevator Company, Farmington, CT (US)

(72) Inventors: Bhabani Sankar Nanda, Orissa (IN); Aditya Swami, Hyderabad (IN); Guru Charan Kottur, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 583 days.

(21) Appl. No.: 16/658,676

(22) Filed: Oct. 21, 2019

(65) Prior Publication Data

US 2020/0122966 A1 Apr. 23, 2020

(30) Foreign Application Priority Data

Oct. 23, 2018 (IN) .............................. 201811039902

(51) Int. Cl.
*G01C 21/12* (2006.01)
*B66B 3/00* (2006.01)
(Continued)

(52) U.S. Cl.
CPC .............. *B66B 3/006* (2013.01); *B66B 1/468* (2013.01); *G01C 21/206* (2013.01); *B66B 2201/4615* (2013.01); *B66B 2201/4653* (2013.01)

(58) Field of Classification Search
CPC . B66B 3/006; B66B 1/468; B66B 2201/4615; B66B 2201/4653; B66B 3/00;
(Continued)

(56) References Cited

U.S. PATENT DOCUMENTS

| 7,620,493 B2 | 11/2009 | Stankiewica et al. |
| 8,676,623 B2 | 3/2014 | Gale et al. |

(Continued)

FOREIGN PATENT DOCUMENTS

| CN | 103476694 A | 12/2013 |
| CN | 105547285 A | 5/2016 |

(Continued)

OTHER PUBLICATIONS

Extended European Search Report; Application No. 19204906.2; dated Mar. 20, 2020; 8 pages.

*Primary Examiner* — Mahendra R Patel
(74) *Attorney, Agent, or Firm* — Cantor Colburn LLP

(57) ABSTRACT

Disclosed is an elevator system for a building, the system including a first elevator for transporting a passenger with a first mobile device between a plurality of lobbies, the system comprising a controller that communicates with the first mobile device renders a plurality of determinations including: a first determination that the passenger is seeking to engage a tenant, whom is a building tenant, a second determination to provide directional information between a current location of the passenger and a first lobby on the first level, a third determination to assign the first elevator to transport the passenger from the first lobby to a second lobby on the second level to engage the tenant, the controller being configured to effect a plurality of transmissions including: a first transmission to the first mobile device to effect the second determination, and a second transmission to the first elevator to effect the third determination.

14 Claims, 3 Drawing Sheets

(51) Int. Cl.
*B66B 1/46* (2006.01)
*G01C 21/20* (2006.01)

(58) Field of Classification Search
CPC ....... B66B 1/06; B66B 1/3423; B66B 1/3446; B66B 2201/21; G01C 21/206
USPC ......................................................... 701/434
See application file for complete search history.

(56) References Cited

U.S. PATENT DOCUMENTS

| | | | | |
|---|---|---|---|---|
| 9,304,003 | B1* | 4/2016 | Ashman | G01C 21/206 |
| 9,539,164 | B2* | 1/2017 | Sanders | A61H 3/061 |
| 9,561,932 | B2* | 2/2017 | Salmikuukka | B66B 3/006 |
| 9,797,732 | B2 | 10/2017 | Li et al. | |
| 9,896,305 | B2* | 2/2018 | Blandin | B66B 1/3461 |
| 9,939,274 | B2 | 4/2018 | Nishimura et al. | |
| 10,683,190 | B2* | 6/2020 | Chapman | B66B 1/468 |
| 2014/0236475 | A1* | 8/2014 | Venkatraman | G01C 21/206 |
| | | | | 701/420 |
| 2015/0185022 | A1* | 7/2015 | Yoo | H04W 4/024 |
| | | | | 701/408 |
| 2016/0140729 | A1 | 5/2016 | Soatto et al. | |
| 2016/0236903 | A1* | 8/2016 | Blom | G06Q 10/00 |
| 2018/0118511 | A1* | 5/2018 | Baldi | G06F 3/0485 |
| 2018/0143025 | A1* | 5/2018 | Kurata | G01C 21/005 |
| 2018/0188033 | A1 | 7/2018 | Zhao et al. | |
| 2018/0282113 | A1* | 10/2018 | Simcik | B66B 1/468 |
| 2018/0327214 | A1* | 11/2018 | Armistead | B66B 1/2458 |
| 2019/0135580 | A1* | 5/2019 | Scoville | B66B 1/468 |

FOREIGN PATENT DOCUMENTS

| | | | | |
|---|---|---|---|---|
| CN | 106335822 A | | 1/2017 | |
| CN | 106915671 A | | 7/2017 | |
| CN | 107339984 A | | 11/2017 | |
| CN | 107796395 A | | 3/2018 | |
| CN | 107806872 A | | 3/2018 | |
| CN | 107861611 A | | 3/2018 | |
| CN | 108027991 A | | 5/2018 | |
| EP | 3381852 A2 * | | 10/2018 | ............ B66B 1/468 |
| EP | 3403965 A1 * | | 11/2018 | ............... B66B 1/06 |
| JP | 4927283 B2 * | | 5/2012 | ............... B66B 1/34 |
| KR | 20170117633 A | | 10/2017 | |
| WO | 2007093665 A1 | | 8/2007 | |
| WO | WO-2007093665 A1 * | | 8/2007 | ............ B66B 1/468 |
| WO | WO-2009024853 A1 * | | 2/2009 | .......... B66B 1/2458 |
| WO | 2016010508 A2 | | 1/2016 | |
| WO | WO-2016010508 A2 * | | 1/2016 | ............ B66B 1/468 |
| WO | 2017025106 A1 | | 2/2017 | |
| WO | WO-2017025106 A1 * | | 2/2017 | ............... B66B 1/28 |

* cited by examiner

ELEVATOR SYSTEM TO DIRECT PASSENGER TO TENANT IN BUILDING WHETHER PASSENGER IS INSIDE OR OUTSIDE BUILDING

CROSS-REFERENCE TO RELATED APPLICATIONS

This application claims the benefit of Indian Application No. 201811039902, filed Oct. 23, 2018, the disclosure of which is incorporated herein by reference in its entirety.

BACKGROUND

The embodiments herein relate to an elevator system and more specifically to an elevator system that directs a passenger to a tenant in the building whether the passenger is inside or outside building.

Elevator requests made by a user/passenger may require the passenger to determine a source and destination floor, which may not be apparent in a building with more than one floor and more than one elevator lobby on each floor.

SUMMARY

Disclosed is an elevator system in a building having a plurality of levels with a respective plurality of lobbies, including a first level having a first lobby and a second level having a second lobby, the system including a first elevator for transporting a passenger with a first mobile device between the plurality of lobbies, the system comprising a controller that communicates with the first mobile device and responsively controls the first elevator to provide elevator service to the passenger, the controller being configured to render a plurality of determinations including: a first determination that the passenger is seeking to engage a tenant, whom is a building tenant, a second determination to provide directional information between a current location of the passenger and the first lobby, a third determination to assign the first elevator to transport the passenger from the first lobby to the second lobby to engage the tenant, the controller being configured to effect a plurality of transmissions including: a first transmission to the first mobile device to effect the second determination, and a second transmission to the first elevator to effect the third determination.

In addition to one or more of the above disclosed features or as an alternate the first determination includes the controller transmitting to the passenger a list of tenants within the building and the controller receiving from the passenger a selection of the tenant.

In addition to one or more of the above disclosed features or as an alternate the controller effects the second transmission upon the passenger entering the building.

In addition to one or more of the above disclosed features or as an alternate when the controller determines that the passenger is outside the building, the second determination includes providing landmark information to the passenger while directing the passenger to the first lobby.

In addition to one or more of the above disclosed features or as an alternate when rendering the second determination the controller communicates with a second mobile device with the tenant to determine a location of the tenant within the building.

In addition to one or more of the above disclosed features or as an alternate the system comprises a plurality of elevators including the first elevator and a second elevator, wherein when rendering the second determination the controller determines the first elevator is distance-wise closer to the tenant than the second elevator.

In addition to one or more of the above disclosed features or as an alternate the controller communicates with the first mobile device over one or more of a first personal area network and a wide area network.

In addition to one or more of the above disclosed features or as an alternate the controller communicates with the first mobile device over the first personal area network when the first mobile device is within the building and over the wide area network when the first mobile device is outside the building.

In addition to one or more of the above disclosed features or as an alternate the controller communicates with the second mobile device over a second personal area network to determine the tenant is located on the second level.

In addition to one or more of the above disclosed features or as an alternate the system comprises a plurality of telecommunication beacons respectively disposed on the plurality of levels through which the controller communicates with a plurality of mobile devices including the first mobile device and the second mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
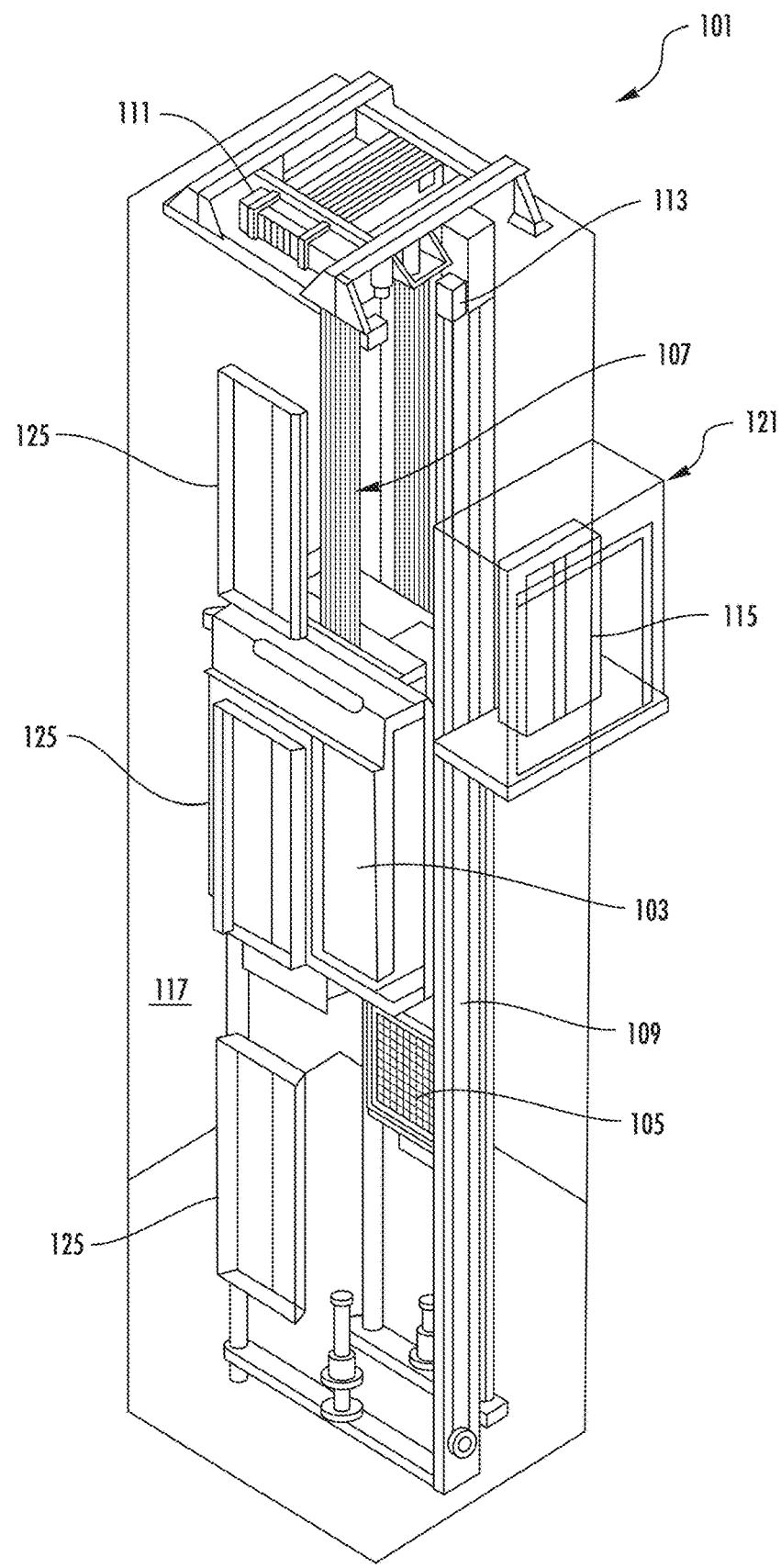
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
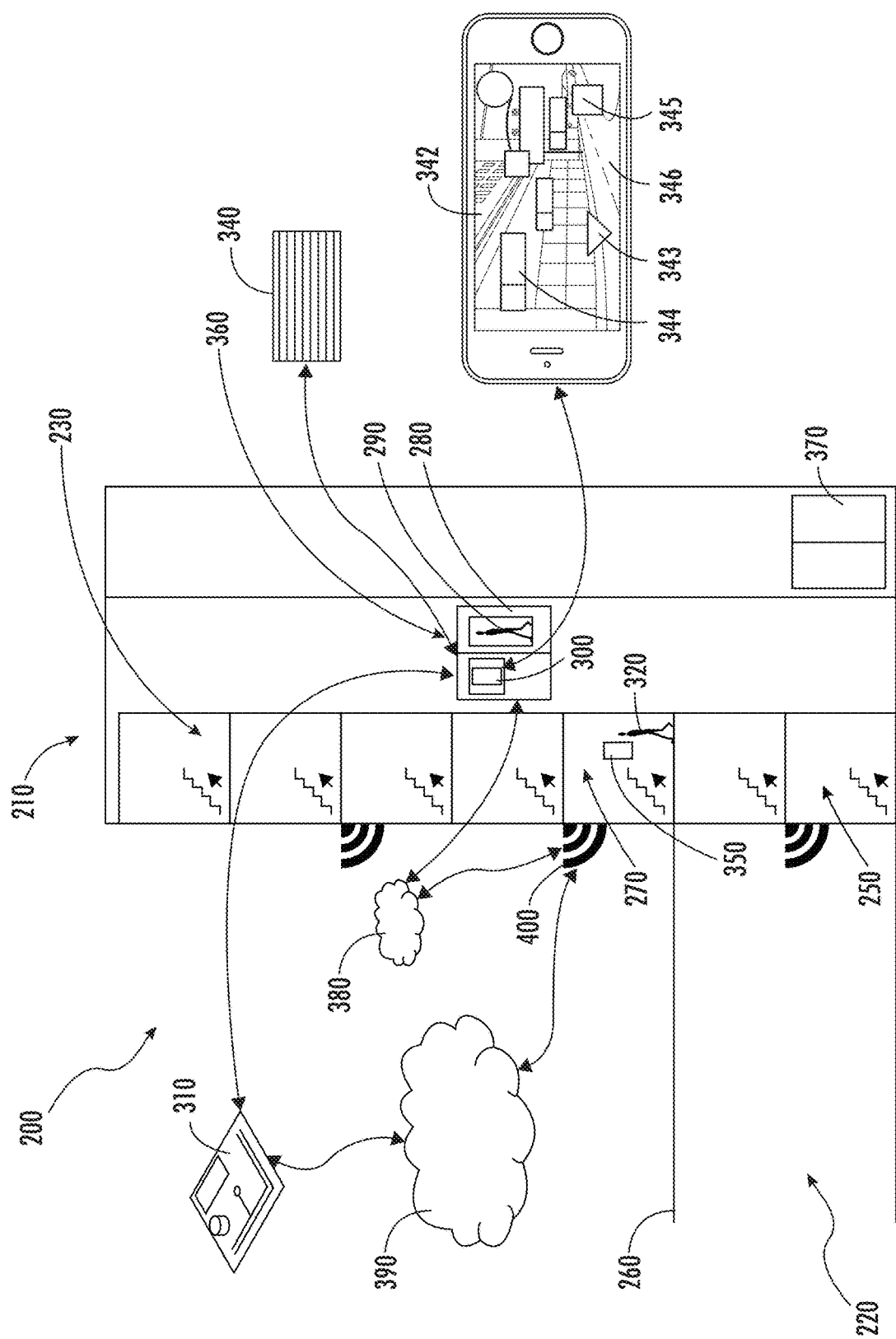
FIG. 2 illustrates features of a disclosed system according to an embodiment.

Turning to FIG. 2, disclosed is an elevator system 200 in a building 210 having a plurality of levels 220 with a respective plurality of lobbies 230, including a first level 240 having a first lobby 250 and a second level 260 having a second lobby 270. The system 200 includes a first elevator car 280 for transporting a passenger 290 with a first mobile device 300 between the plurality of lobbies 230. According to an embodiment, the system 200 may comprise a controller 310 that communicates with the first mobile device 300 and responsively controls the first elevator car 280.

Figure 3:
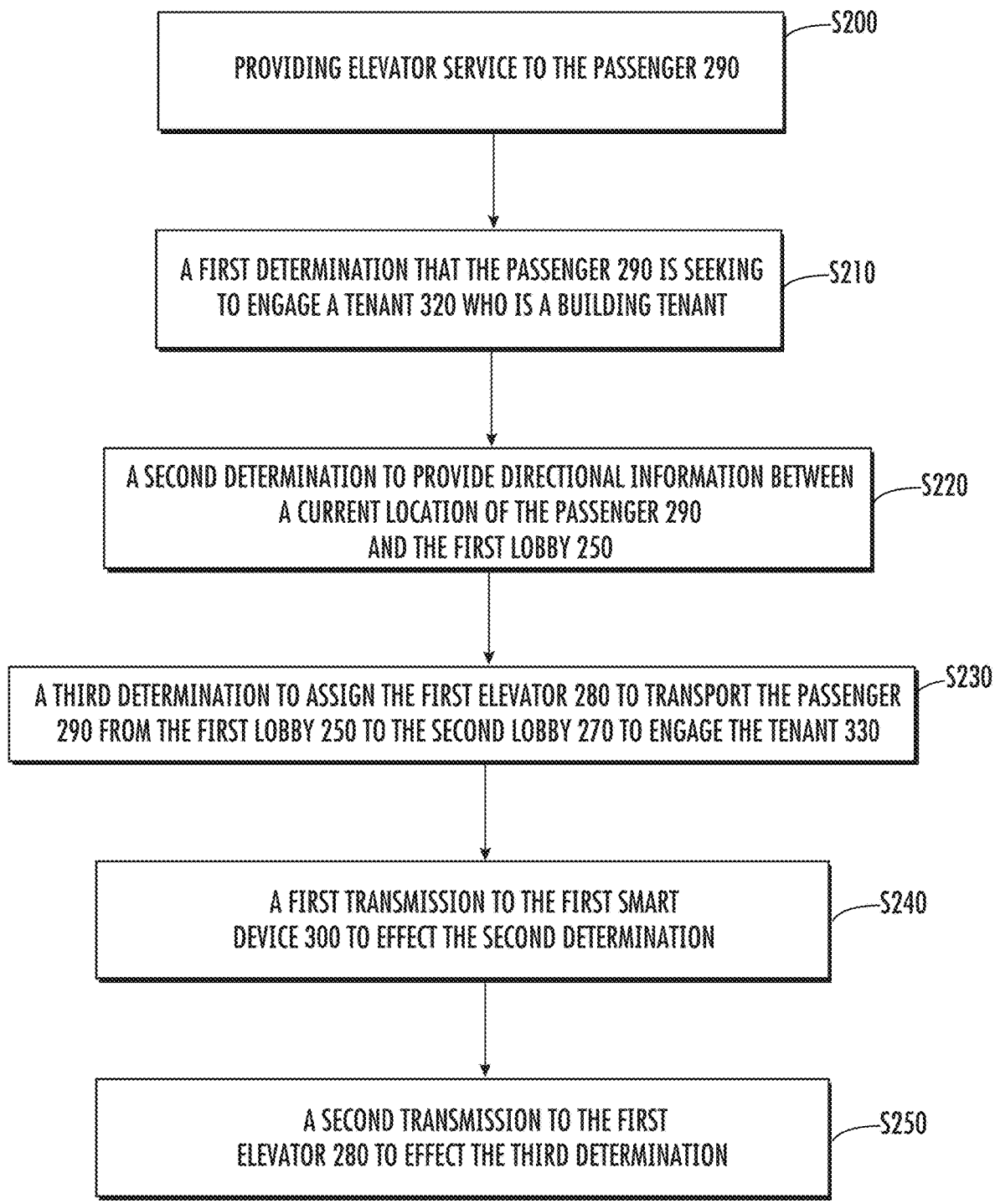
FIG. 3 illustrates a process executed by a disclosed system according to an embodiment.

Turning to FIG. 3, the controller 310 performs a process S200 of providing elevator service to the passenger 290. Step S200 includes the controller 310 being configured to render a plurality of determinations. At step S210 the controller 310 renders a first determination that the passenger 290 is seeking to engage a tenant 320, whom is a building tenant. At step S220 the controller 310 renders a second determination to provide directional information between a current location of the passenger 290 and the first lobby 250.

At step S230 the controller 310 renders a third determination to assign the first elevator car 280 to transport the passenger 290 from the first lobby 250 to the second lobby 270 to engage the tenant 320. Step S230 may include the controller 310 effecting a plurality of transmissions. At step S240 the controller 310 effects a first transmission to the first mobile device 300 to effect the second determination. At step S250 the controller 310 effects a second transmission to the first elevator car 280 to effect the third determination.

According to an embodiment the first determination may include the controller 310 transmitting to the passenger a list of tenants 340 within the building 210 and the controller 310 receiving from the passenger 290 a selection of the tenant 320. According to an embodiment the controller 310 may affect the second transmission upon the passenger 290 entering the building 210. This way, if the tenant 320 moves around the building 210 while the passenger 290 is traveling to the building 210, elevator service will not need to be reassigned.

According to an embodiment when the controller 310 determines that the passenger 290 is outside the building 210, the second determination may include providing the passenger 290 with landmark information 342 along with the directions to the first lobby 250. For example, the controller 310 may instruct the first mobile device 300 to graphically illustrate street identifiers 343, restaurants 344, pharmacies (Rx) 345 and other landmarks on a walking and/or driving path 346 between a current location of the passenger and the building. For example, the first mobile device 300 may be a mobile phone, tablet or the like with a graphical user interface on which such illustration may be provided.

According to an embodiment when rendering the second determination the controller 310 communicates with a second mobile device 350 with the tenant 320 to determine a location in the building 210 for the tenant 320. For example, the building 210 has a plurality of elevators 360 including the first elevator car 280 and a second elevator car 370. Wherein when rendering the second determination, the controller 310 determines the first elevator 280 is distance-wise closer to the tenant 320 than the second elevator 370.

According to an embodiment the controller 310 communicates with the first mobile device 300 over one or more of a first personal area network 380 and a wide area network 390. More specifically the controller 310 may communicate with the first mobile device 300 over the first personal area network 380 when the first mobile device 300 is within the building 210 and over the wide area network 390 when the first mobile device 300 is outside the building 210. Access to the wide area network may be form a cellular network.

According to an embodiment, the controller 310 communicates with the second mobile device 350 over a second personal area network 380 to determine the tenant 320 is located on the second level 260. According to an embodiment the system 200 includes a plurality of telecommunication beacons 400 respectively disposed on the plurality of levels 220 through which the controller 310 communicates with a plurality of mobile devices including the first mobile device 300 and the second mobile device 350. According to an embodiment the personal area network is a Bluetooth network.

As described above, a mobile application may help direct a user outside a building to a tenant inside a building as well as to an appropriate elevator lobby within the building. The system may place an elevator call once the user is inside the building.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system in a building having a plurality of levels with a respective plurality of lobbies, including a first level having a first lobby and a second level having a second lobby, the system including a first elevator for transporting a passenger with a first mobile device between the plurality of lobbies,
    the system comprising a controller that communicates with the first mobile device and responsively controls the first elevator to provide elevator service to the passenger,
    the controller being configured to render a plurality of determinations including:
        a first determination that the passenger is seeking to engage a tenant, whom is a building tenant,
        a second determination to provide directional information between a current location of the passenger and the first lobby,
        a third determination to assign the first elevator to transport the passenger from the first lobby to the second lobby to engage the tenant,
    the controller being configured to effect a plurality of transmissions including:
        a first transmission to the first mobile device to effect the second determination, and
        a second transmission to the first elevator to effect the third determination; and
    the elevator system including:
        a plurality of elevators including the first elevator and a second elevator, wherein when rendering the second determination the controller determines the first elevator is distance-wise closer to the tenant than the second elevator,
    wherein the controller communicates with the first mobile device over one or more of a first personal area network and a wide area network, and
    wherein the controller communicates with the first mobile device over the first personal area network when the first mobile device is within the building and over the wide area network when the first mobile device is outside the building.

2. The system of claim 1 wherein the first determination includes the controller transmitting to the passenger a list of tenants within the building and the controller receiving from the passenger a selection of the tenant.

3. The system of claim 1 wherein the controller effects the second transmission upon the passenger entering the building.

4. The system of claim 1 wherein when the controller determines that the passenger is outside the building, the second determination includes providing landmark information to the passenger while directing the passenger to the first lobby.

5. The system of claim 4 wherein when rendering the second determination the controller communicates with a second mobile device with the tenant to determine a location of the tenant within the building.

6. The system of claim 1 wherein the controller communicates with the second mobile device over a second personal area network to determine the tenant is located on the second level.

7. The system of claim 6 comprising a plurality of telecommunication beacons respectively disposed on the plurality of levels through which the controller communicates with a plurality of mobile devices including the first mobile device and the second mobile device.

8. A method for operating an elevator system with a first elevator to transport a passenger with a first mobile device between the plurality of lobbies in a building, the building having a plurality of levels with a respective plurality of lobbies, including a first level having a first lobby and a second level having a second lobby,
    the system including a controller that communicates with the first mobile device and responsively controls the first elevator to provide elevator service to the passenger,
    the method comprising:
        the controller rendering a plurality of determinations including:

a first determination that the passenger is seeking to engage a tenant, whom is a building tenant, a second determination to provide directional information between a current location of the passenger and the first lobby, a third determination to assign the first elevator to transport the passenger from the first lobby to the second lobby to engage the tenant, the controller effecting a plurality of transmissions including:

a first transmission to the first mobile device to effect the second determination, and a second transmission to the first elevator to effect the third determination; and the elevator system including:

a plurality of elevators including the first elevator and a second elevator, wherein when rendering the second determination the controller determines the first elevator is distance-wise closer to the tenant than the second elevator, wherein the controller communicates with the first mobile device over one or more of a first personal area network and a wide area network, and wherein the controller communicates with the first mobile device over the first personal area network when the first mobile device is within the building and over the wide area network when the first mobile device is outside the building.

9. The method of claim 8 wherein the first determination including the controller transmitting to the passenger a list of tenants within the building and the controller receiving from the passenger a selection of the tenant.

10. The method of claim 8 wherein the controller effects the second transmission upon the passenger entering the building.

11. The method of claim 8 wherein when the controller determines that the passenger is outside the building, the second determination includes providing landmark information to the passenger while directing the passenger to the first lobby.

12. The method of claim 11 wherein when rendering the second determination the controller communicates with a second mobile device with the tenant to determine a location of the tenant within the building.

13. The method of claim 1 wherein the controller communicates with the second mobile device over a second personal area network to determine the tenant is located on the second level.

14. The method of claim 13 comprising a plurality of telecommunication beacons respectively disposed on the plurality of levels through which the controller communicates with a plurality of mobile devices including the first mobile device and the second mobile device.

* * * * *